(12) United States Patent
Shiba

(10) Patent No.: US 8,424,173 B2
(45) Date of Patent: Apr. 23, 2013

(54) SPACER CLIP

(75) Inventor: Daisuke Shiba, Toyohashi (JP)

(73) Assignee: Newfrey LLC, Newark, DE (US)

( * ) Notice: Subject to any disclaimer, the term of this patent is extended or adjusted under 35 U.S.C. 154(b) by 699 days.

(21) Appl. No.: 12/645,849

(22) Filed: Dec. 23, 2009

(65) Prior Publication Data

US 2010/0162537 A1 Jul. 1, 2010

(30) Foreign Application Priority Data

Dec. 25, 2008 (JP) .................................. 2008-329505

(51) Int. Cl.
*F16B 13/04* (2006.01)
*F16B 37/04* (2006.01)
*B60R 13/08* (2006.01)

(52) U.S. Cl.
USPC ............ 24/458; 24/581.11; 24/297; 411/340; 411/344; 411/345

(58) Field of Classification Search .................... 24/297, 24/457, 458, 581.11; 248/231.9, 222.12; 411/340, 344, 345
See application file for complete search history.

(56) References Cited

U.S. PATENT DOCUMENTS 7,143,485 B2    12/2006   Kanie

FOREIGN PATENT DOCUMENTS

| JP | 4111905 U1 | 9/1992 |
| JP | 2004-116628 A2 | 4/2004 |
| JP | 2006-009867 A2 | 1/2006 |

*Primary Examiner* — Robert J Sandy
(74) *Attorney, Agent, or Firm* — Michael P. Leary

(57) ABSTRACT

A spacer clip includes a flange, a shank extending from the flange that can be inserted into a through in a member being attached to, and legs extending from the end part of the shank, connected by hinges to the shank end part so as that they can pivot from an initial attitude to a clamping attitude wherein they are substantially parallel to the flange. Levers extend from root portions of the legs toward the tip ends of the legs so that they can pivot together with the legs. The legs have leg-side pawls in the portions thereof adjacent to the shank end part, which extend to the flange side when the legs are in the clamping attitude; the flange has flange-side pawls for engaging the leg-side pawls and maintaining the legs in the clamping attitude; and slits are formed on either side of the flange-side pawls.

5 Claims, 3 Drawing Sheets

SPACER CLIP

CROSS-REFERENCE TO RELATED APPLICATIONS

This application claims the benefit of Japanese Application No. 2008-329505 filed Dec. 25, 2008, the disclosure of which is incorporated herein by reference.

BACKGROUND OF THE INVENTION

Technical Field

The present invention relates to a spacer clip for attachment to a member being attached to such as a soft sheet member having a through hole therein, and more particularly to a spacer clip that can be secured to a sheet material such as soundproofing material by being passed through a through hole and clamping from both sides and can be used to attach that sheet member to another member, such as a panel.

This spacer clip comprises a flange that can flushly contact one surface of a member being attached to, a shank that extends from the flange a prescribed length and can be inserted into a through hole, and arms that extend from the end part of the shank, hinged to the end part of the shank so as to be able to pivot from an initial attitude of orientation along the axial direction of the shank to a clamping attitude substantially parallel to the flange and able to flushly contact the surface of a member being attached to on the opposite side from the flange, and levers extending from root portions of the legs toward the tip ends of the legs so that they can pivot together with the arms which extend with an interval between themselves and the arms, whereby the member being attached to can be clamped at the through-hole portion.

With this spacer clip, when the arms and the shank are inserted into the through hole of a member being attached to such as a soundproofing material, the arms and the levers topple to the outer circumferential side, and the member being attached to is secured between the arms and the levers. This spacer clip can be attached to the member being attached to by an operation from one side.

However, with the spacer clip of Patent Literature 1, the structure is such that the latching pawls on the flange side are difficult to flex. As a consequence, when putting it into a coupled condition, it is necessary to forcefully press the outsides of the arms against the member being attached to, wherefore they are often pressed against by a backing member.

Patent Literature 2 discloses a fastener for securing carpet to a floor surface. This fastener comprises a latching barrel having (a) latching pawl(s) on the inner circumferential surface thereof for attaching to a latching stud bolt, and a press-down barrel, having on one end thereof a press-down flange, which is inserted in the latching barrel in order to be able to extend or retract in the direction of that barrel, wherein in the portions of the latching barrel and press-down barrel that mutually engage, latching surfaces and latching pawls are formed for securely but detachably attaching the two barrels at any length of extension.

In Patent Literature 2, pawls are formed for joining two components.

Patent Literature 3 discloses a clip used for attaching impact energy absorption material (EA material). With this clip, a projection on the trim side is inserted into a clip imbedded in the front surface part of EA material, causing protrusions on the projection to latch in steps in that other clip, whereby the protrusions are prevented from separating from the steps.

In Patent Literature 3, projections and steps are formed for joining two components.

Patent Literature 1: TOKKAI [Unexamined Patent Application] No. 2004-116628 (Gazette)

Patent Literature 2: JIKKAI [Unexamined Utility Model Application] No. H4-111905/1992 (Gazette)

Patent Literature 3: TOKKAI No. 2006-9867 (Gazette)

SUMMARY OF THE INVENTION

An aspect of an exemplary embodiment of the present invention is to provide a clip that is a spacer clip which can be attached to a member being attached to such as a sheet member by the operation of pressing it in from one side, that can be easily coupled to the member being attached to with a light pressure and that can yield sufficient retention strength.

One embodiment of the present invention is a spacer clip that is secured to a member being attached to, such as a soft sheet member, having a through hole, by being passed through the through hole and clamping the member being attached to from both sides, comprising a flange, formed larger than the through hole of the member being attached to, that can flushly contact one surface of the member being attached to; a shank extending a prescribed length from the flange, that can be inserted into the through hole; legs extending from the end part of the shank, connected by hinges to the shank end part so that they can pivot from an initial attitude of orientation along the axial direction of the shank to a clamping attitude substantially parallel to the flange, that can flushly contact the surface of a member being attached to on the opposite side from the flange; and levers extending from root portions of the legs toward the tip ends of the legs so that they can pivot together with the legs, which extend with an interval between themselves and the legs, whereby the member being attached to can be clamped at the through-hole portion; wherein: the legs have leg-side pawls in the portions thereof adjacent to the shank end part, which extend to the flange side when the legs are in the clamping attitude; the flange has flange-side pawls for engaging the leg-side pawls and maintaining the legs in the clamping attitude; and slits are formed on either side of each of the flange-side pawls.

In the spacer clip described above the legs, prior to being inserted into the through hole, may be in the initial attitude of orientation along the axial direction and that the levers be in an initial attitude of facing the surface of the member being attached to that is on the flange side; that as the shank is inserted into the through hole, the legs and the levers pivot together at the shank end part as they clamp the through-hole portion of the member being attached to from both sides; such that when the leg-side pawls come up against the flange-side pawls, the flange-side pawls flex upward from the roots of the slits; and that when the legs are pivoted to the clamping attitude, the leg-side pawls engage with the flange-side pawls, and the surface of the member being attached to that is on the flange side comes up against the flange.

With this spacer clip, prior to the shank being inserted into a through hole, the legs may be in the initial attitude of orientation along the axial direction of the shank, and the levers are in the initial attitude of facing the surface of the member being attached to on the flange side, whereby insertion of the legs into the through hole of the sheet member is made easy. As the legs and shank are inserted into the through hole, the levers come up against the member being attached to and, together with the legs, pivot at the end part of the shank so as to clamp the member being attached to from both sides of the through-hole portion, whereupon the legs consequently positively topple over to the outer circumferential side of the through hole. Furthermore, when the flange is pressed into the member being attached to so that the shank is inserted into the through hole, the levers are pressed between the member being attached to and the flange and assume an attitude of being parallel with the flange, the legs also, being secured to the levers, topple over so as to become parallel with the flange and pivot to a clamping attitude, and the surface on the flange side of the member being attached to comes up against the flange.

Because slits are formed on either side of the flange-side pawls, the flange-side pawls are made so that they readily flex, and so that when they pivot from the initial attitude to the clamping attitude and the leg-side pawls come up against those flange-side pawls, the flange-side pawls flex upward from the roots of those slits.

As a consequence, merely by inserting the legs and the shank into the through hole with a small pressing-in force, the spacer clip is secured to the member being attached to, and the spacer clip is well attached to the member being attached to by an operation from one side.

In the spacer clip described above, the legs and the levers are provided at the shank end part in pairs, respectively, so as to be opposed in the radial direction.

It is preferable that recesses be formed in the flange-side pawls, that protrusions be formed in the leg-side pawls of such size as to be able to fit in the recesses, and that when the leg-side pawls engage with the flange-side pawls, the protrusions enter into the recesses.

By engaging the recesses of the flange-side pawls and the protrusions of the leg-side pawls, the spacer clip is positively maintained in the clamping attitude.

It is preferable that in the legs, in the surfaces thereof that come up against the member being attached to, projections be formed for biting into the member being attached to.

Thereby, the member being attached to can be positively held.

The shank may be formed hollow so as to accept a threaded stud and that latching pawls be provided, in the portion thereof that is hollow, for latching to the stud.

Thereby, the spacer clip can be positively secured to the threaded stud.

Based on the present invention, by providing slits for the flange-side pawls, the flange-side pawls will flex during insertion, and the force required for insertion can be reduced.

Moreover, by providing recesses in the flange-side pawls and protrusions in the leg-side pawls and causing the recesses and protrusions to engage, meshing after locking is enhanced, and sufficient retention strength can be obtained.

Furthermore, by having projections formed in the legs which bite into the sheet member, the spacer clip can be secured to the sheet member with sufficient retention strength.

DETAILED DESCRIPTION OF EXEMPLARY EMBODIMENTS OF THE INVENTION

Figure 1:
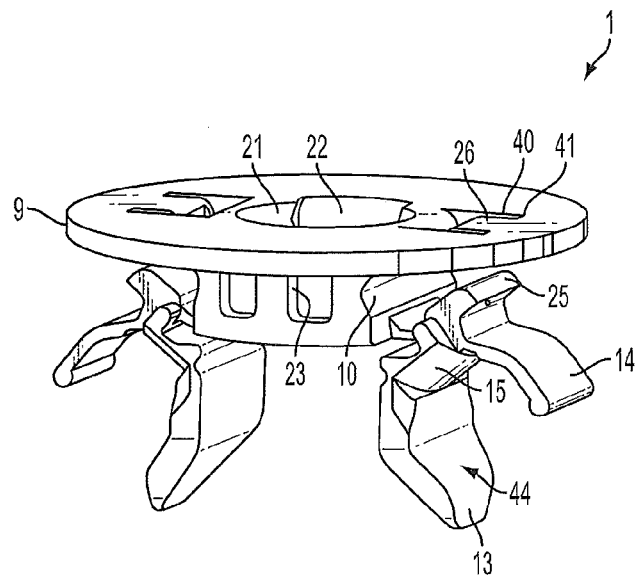
FIG. 1 is a perspective view of a spacer clip based on an exemplary embodiment of the present invention.
Figure 2:
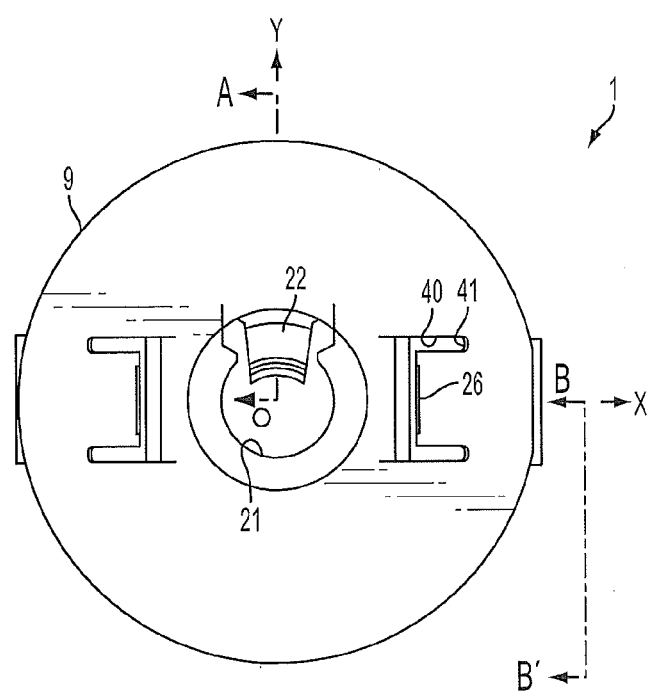
FIG. 2 is a top view of the spacer clip of FIG. 1.
Figure 3:
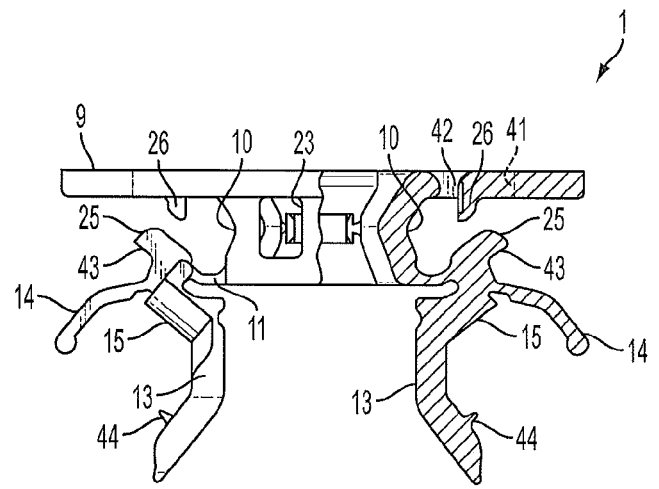
FIG. 3 is semi-sectional side elevation of the spacer clip of FIG. 1.
Figure 4:
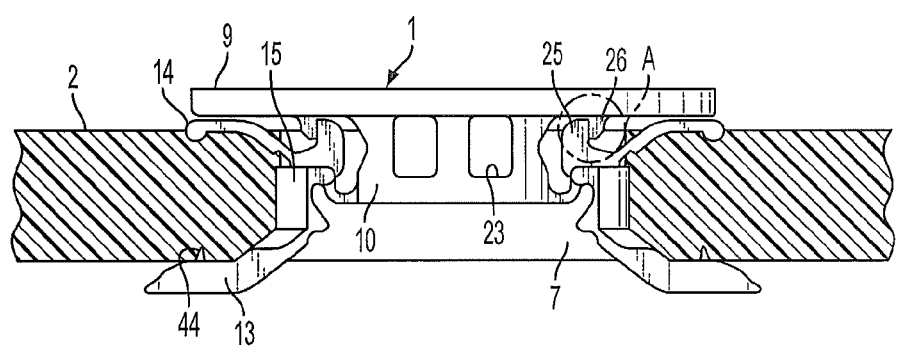
FIG. 4 shows a condition wherein a spacer clip in an embodiment of the present invention is attached to a sheet member such as a soundproofing material.
Figure 6:
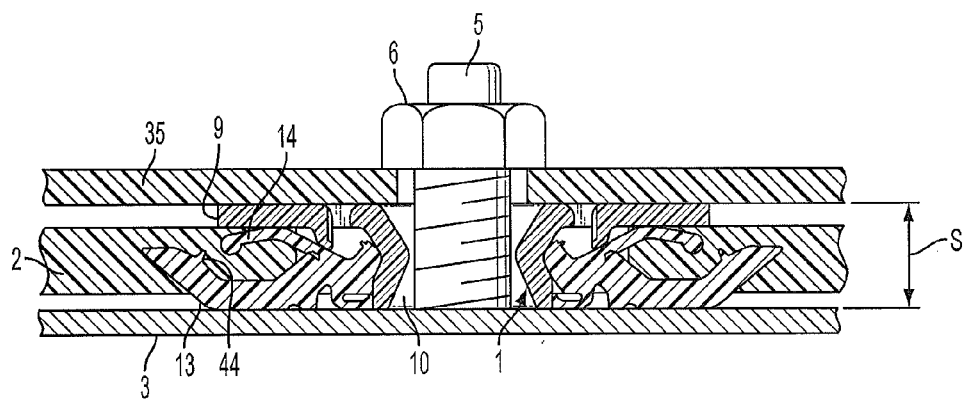
FIG. 6 shows a condition wherein a sheet member to which the spacer clip has been coupled is secured, together with another member, to a body.

Exemplary embodiments of the present invention will now be described with reference to the Drawings. In FIGS. 1 to 3, a spacer clip 1 relating to an exemplary embodiment of the present invention is shown FIG. 4 shows another condition wherein the spacer clip 1 is attached to a sheet member 2 such as a soundproofing material that is a member being attached to. FIG. 6 shows a condition wherein the sheet member 2 to which the spacer clip 1 has been coupled is secured by a stud 5 and a nut 6 to a member such as a vehicle body 3. The spacer clip 1, as shown in FIG. 4, is secured to a soft sheet member 2 having a through hole 7 by being passed through that through hole and clamping the sheet member 2 from both sides. Even when the sheet member 2 that is the member being attached to is a soft material such as a soundproofing material, the spacer clip 1 can attach the sheet member 2 to another member such as a vehicle body 3 without deforming and while maintaining a certain thickness in the sheet member.

FIG. 1 is a perspective view of the spacer clip 1 as based on an embodiment of the present invention. FIG. 2 is a top view of the spacer clip 1 shown in FIG. 1. FIG. 3 is a semi-sectional side elevation of the spacer clip shown in FIG. 1, with the right side of FIG. 3 being the section along the A-O line in FIG. 2, and the left side thereof being a view from the B-B' direction. The spacer clip 1 is an integrally molded molding formed of a soft plastic material. The spacer clip 1 comprises a round flange 9, formed with a larger diameter than that of the through hole 7 of the sheet member 2, which can flushly contact one side of the sheet member.

As shown in FIG. 3, below the flange 9 is a shank 10. This shank 10 has a prescribed length from the flange 9 corresponding to the thickness of the sheet member 2, the outer shape of which is of such size as to permit insertion into a through hole 7 in the sheet member. In this embodiment of the present invention, the outer shape of the cross-section of the shank 10 is substantially rectangular, but is not limited to such shape. At least a part of the outer shape may be made a shape that follows the sheet member through hole 7.

In the end part of the shank 10 are comprised legs 13. The legs 13 are connected to the shank 10 by hinges 11 and can flushly contact the sheet member 2 on the side opposite from the flange 9 side. The legs 13 can pivot about the hinges 11 from an initial attitude of orientation along the axial direction of the shank 10 to a clamping attitude wherein they are substantially parallel to the flange.

The spacer clip 1 also comprises levers 14. The levers 14 extend from the root portions of the legs 13 toward the tip ends of the legs so as to be able to pivot, together with the legs 13, relative to the shank 10. The levers 14 can flushly contact the sheet member 2 on the same side as the flange 9. The interval between each lever 14 and leg 13 is an interval whereby the portion of the sheet member 2 that is the through-hole portion 7 can be clamped.

The portions between the legs 13 and the levers 14 are intermediate portions 15, which in the present embodiment have a circular arc shape. It is preferable that these intermediate portions 15 be of a shape that will match the inner diameter of the through hole 7 of the sheet member 2 after the spacer clip 1 has been coupled to the sheet member.

The legs 13 and levers 14, respectively, are provided in pairs relative to the center of the shank 10, in the end part of the shank 10. The hinges 11 for connecting the legs 13 and the levers 14 to the shank are also provided in a pair in like manner. The hinges 11 severally maintain the legs 13 in the initial attitude of orientation along the axial direction of the shank 10 prior to attachment to the sheet member 2, and the legs 13 are formed so that they can pivot when attachment to the sheet member is effected. Consequently, with the spacer clip 1, prior to insertion of the shank 10 into the through hole 7 in the sheet member 2, the legs 13 are maintained in the initial attitude of orientation along the axial direction of the shank 10, and the levers 14 also are maintained in the initial attitude of facing the surface on the flange 9 side of the sheet member 2.

As the shank 10 is being inserted into the through hole 7 of the sheet member 2, the legs 13 and the levers 14 together pivot about the hinges 11 in the end part of the shank while clamping both sides of the through-hole portion of the sheet member, with the legs 13 being pivoted to the clamping attitude and the levers 14 also being pivoted to an attitude of orientation along the flange 9.

As shown in FIGS. 1 and 2, shank 10 has an axial-direction hole 21 formed in the center thereof for accepting a threaded stud 5 or the like. The inner shape of the axial-direction hole 21 is of a size whereby the threaded stud 5 can be accepted. In the direction of the legs 13 (the Y direction) in the shank 10, the intermediate part of the shank 10 in the height dimension is curved. Provision is made so that the threaded stud 5 is positioned by the inner surfaces of the shank 10. At least a part of the inner shape of the axial-direction hole 21 may be made a circular arc shape that follows the outer shape of the threaded stud 5.

In the axial-direction hole 21, one latching pawl 22 is provided for latching to a threaded stud or the like. When the spacer clip 1 is pushed down over the threaded stud 5, the latching pawl 22 presses the threaded stud 5 against the inner surface of the shank 10 on the opposite side from the latching pawl 22. Provision is made so that the threaded stud 5 is positioned in the X direction.

The latching pawl 22 may be provided in a plurality, or it may be omitted altogether. Referring now to FIG. 6, the length of the shank 10 is formed so that when a member 35 other than a front panel or the like is attached by the spacer clip 1 in a condition wherein a sheet member 2 has been attached to a vehicle body 3, that other member 35 is maintained at a certain interval S from the vehicle body 3. Thereby, the sheet member 2 is supported between the vehicle body 3 and the member 35 without being deformed. The length of the shank 10, moreover, may be formed to match the thickness of the sheet member 2. In the side-wall portion of the shank 10, holes 23 are formed. There is no limitation on the shapes of the holes 23. The shape of the side-wall portion need only be one whereby the shank can be inserted into a through hole in the sheet member 2, and one whereby the threaded stud 5 is positioned at the inner surfaces thereof.

As shown in FIG. 4, in the spacer clip 1, means are provided for locking the legs 13 in the clamping attitude after attachment to the sheet member 2. The legs 13 have leg-side pawls 25 in the root portions thereof adjacent to the hinges 11 at the end part of the shank 10, which extend to the flange 9 side in the condition wherein the legs are in the clamping attitude. As shown in FIGS. 3 and 4, on the flange 9 side at positions near the shank 10, flange-side pawls 26 are formed for engaging with the leg-side pawls 25 and maintaining the legs 13 in the clamping attitude. When the legs 13 are made to pivot on the hinges 11 and put in the clamping attitude, parallel to the flange 9, the leg-side pawls 25 pivot together with the legs 13 and ride over and engage with the flange-side pawls 26 (in the condition wherein the spacer clip 1 is coupled to the sheet member 2). By this engagement, the legs 13, working in cooperation with the flange 9, clamp the sheet member 2.

Referring now to FIGS. 1 and 2, slits 40 are formed on both sides of the flange-side pawls 26 at the portions close to the flange, to make it easy for the tip ends of the flange-side pawls 26 to flex from slit root parts 41. When the legs 13 pivot in the condition wherein the spacer clip is coupled to sheet member 2, the flange-side pawls 26 flex from the slit root parts 41. As a consequence, the leg-side pawls 25 and flange-side pawls 26 can be engaged with a light pressure.

In the condition wherein the spacer clip is coupled to a sheet member, the sheet member 2 is clamped by the legs 13 and the flange 9, so the spacer clip 1 is secured to the sheet member 2.

Figure 5:
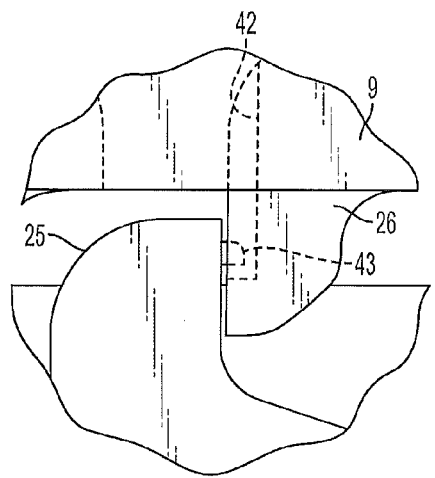
FIG. 5 is an enlarged detail view of the portion in FIG. 4 of circle A.

As shown in FIG. 5, recesses 42 are formed in the flange-side pawls 26, and in the leg-side pawls 25, protrusions 43 are formed which can fit in the recesses 42. Provision is made so that in the condition wherein the spacer clip is coupled to a sheet member 2 (the locked condition), the protrusions 43 of the leg-side pawls 25 mesh into the recesses 42 of the flange-side pawls 26, so that sufficient retention strength can be obtained.

When the spacer clip 1 is attached to the sheet member 2, the intermediate portions 15 between the legs 13 and levers 14 come up against the inner diameter of the through hole 7 in the sheet member 2. The outer shape of the intermediate portions 15 should preferably be one that curves along the inner diameter of the through hole 7 in the sheet member 2; that is, it should be a circular arc shape if the through hole is round.

In the legs 13, moreover, in the surfaces that come up against the sheet member 2, projections 44 are formed. The projections 44, when the spacer clip 1 is coupled to a sheet member 2 such as a soundproofing material, bite into the sheet member 2 and thereby make it possible to obtain sufficient retention strength so that the spacer clip 1 does not fall away from the sheet member 2. In this embodiment, one projection 44 is formed in each leg 13, but the number of these projections 44 may be made two or more.

Condition Wherein the Spacer Clip is Coupled to a Sheet Member

FIG. 4 illustrates the condition wherein the spacer clip 1 is coupled to a sheet member 2. A worker grasps the flange 9 with the legs 13 pointing out and inserts the shank 10 into the through hole 7 in the sheet member 2. As the legs 13 are inserted so that they pass through the through hole 7 in the sheet member 2 and emerge on the side opposite the flange 9 side and so that the levers 14 are inserted along the flange 9 side of the sheet member 2, the levers 14 come up against the sheet member 2 and topple over to the outside. In conjunction with this, the legs 13 also, together therewith, topple to the outer circumferential side of the through hole 7, the through hole 7 portion 31 of the sheet member 2 is accepted between the legs 13 and levers 14, and a condition ensues wherein the legs 13 and the levers 14 clamp the through-hole portion 7 of the sheet member 2 from both sides. When the sheet member 2 is a soft material such as a soundproofing material, if the legs 13 are merely inserted into the through hole 7, they may not topple over to the outside of the through hole 7. In such cases, with the levers 14 up against the sheet member 2, the legs 13 are toppled over to the outside of the through hole 7.

The intermediate portions 15 intermediate between the legs 13 and levers 14 will make contact with the inner diameter of the through hole 7.

In this embodiment, because the slits 40 are formed on both sides of the flange-side pawls 26 at the ends near the flange, when the leg-side pawls 25 ride over the flange-side pawls 26, the tip ends of the flange-side pawls 26 will flex upward from the slit root parts 41. Consequently, it is possible to engage the leg-side pawls 25 and the flange-side pawls 26 with a light pressure.

By disposing a rigid plate-form backing member (not shown in the Drawings) on the back side of the sheet member 2 and pressing the legs 13 against the backing member, it is also possible to pivot the legs 13 so that they topple over to the outside and press against the flange 9 side. Thereby, the levers 14 also will come up against the flange side surface of the sheet member 2.

When the legs 13 are pivoted to the clamping attitude parallel to the flange 9, the leg-side pawls 25 will pivot together with the legs 13 and ride over and engage with the flange-side pawls 26, by which engagement the legs 13 will be locked in place in the clamping attitude and will work in cooperation with the flange 9 to clamp the sheet member 2, as shown in FIG. 4. Because the sheet member 2 is clamped from both sides by the legs 13 and the flange 9, the spacer clip 1 is secured to the sheet member 2.

Locked Condition

FIG. 5 is an enlarged view of the section in FIG. 4 within the dotted broken line circle A. In the locked condition, the protrusions 43 of the leg-side pawls 25 mesh in the recesses 42 of the flange-side pawls 26, whereupon sufficient retention strength can be obtained.

As shown in FIG. 4, moreover, by the projections 44 formed in the legs 13 biting into the sheet member 2 that is soundproofing material or the like, sufficient retention strength can be obtained so that the spacer clip 1 will not fall away from the sheet member 2.

Condition Wherein the Spacer Clip is Coupled to a Vehicle Body

FIG. 6 shows a condition wherein the sheet member 2 such as a soundproofing material to which the spacer clip 1 has been attached, is attached to a vehicle body 3 or the like. The sheet member 2 to which the spacer clip 1 is attached is conveyed to a prescribed position on the vehicle body 3, whereon a stud 5 such as a threaded stud has been erected, the shank 10 of the spacer clip 1 is positioned so that the stud 5 is accepted in the axial-direction hole 21 and in that condition, attachment to the vehicle body 3 is effected. The latching pawl 22 of the shank 10 engages the threads of the stud 5, and the sheet member 2 is provisionally latched to the vehicle body. At that time, the stud 5 is pressed against the inner surface of the shank 10 on the side opposite the latching pawl 22 and positioned. The stud 5 is positioned by the inner surface of the shank 10 in a direction perpendicular to the direction in which the latching pawl 22 lies.

After provisional latching, the nut 6 is screwed down on the stud 5 and final latching is effected. In this final latching, another member 35 such as a front panel for covering the sheet member 2 is deployed between the nut 6 and the end part of the shank 10 and finally latched together with the sheet member 2. In the spacer clip 1, the length of the shank 10 is determined at a prescribed length S. Thereby, a certain interval S is secured between the vehicle body 3 and the panel 35, and the sheet member 2 is secured to the vehicle body 3 without being deformed. When the sheet member 2 is a soundproofing material, for example, its function is preserved.

In the condition shown in FIG. 6, the legs 13 are pressed to the flange 9 side, the legs 13 deform at the places where they are joined to the levers 14, and the intervals between the legs 13 and the levers 14 are made narrower than in the condition shown in FIG. 4.

Industrial Use

Exemplary embodiments of the spacer clip 1 of the present invention may be used for applications such as attaching a sheet member such as a soundproofing material to another member such as a panel. Of course, it is not limited to use with such a material or panel.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A spacer clip that is secured to a member being attached to, the member being attached to having a through hole and two sides, the spacer clip being secured by being passed through said through hole and clamping the member being attached to from both sides, comprising:

a flange having a front side and an opposite side and being formed larger than said through hole of said member being attached to, that can flushly contact one surface of the member being attached to;

a shank having an end part extending a prescribed length from said flange that can be inserted into said through hole;

legs extending from the end part of said shank, connected by hinges to said shank end part in order to pivot from an initial attitude of orientation along the axial direction of the shank to a clamping attitude of being substantially parallel to said flange, that can flushly contact the surface of a member being attached to on the opposite side from said flange; and levers extending from root portions of the legs toward tip ends of the legs so that the levers can pivot together with said legs which extend with an interval between the levers and the legs, whereby said member being attached to can be clamped at said through-hole portion; wherein:

said legs have leg-side pawls adjacent to said shank end part, which extend to said flange side when the legs are in said clamping attitude;

said flange has flange-side pawls for engaging said leg-side pawls and maintaining said legs in said clamping attitude; and wherein:

said legs, prior to being inserted into said through hole, are in said initial attitude of orientation along said axial direction, and said levers are in an initial attitude of facing the surface of said member being attached to that is on the flange side;

said legs and said levers, as said shank is inserted into said through hole, pivot together at said shank end part as said legs and said levers clamp the through-hole portion of said member being attached to from both sides;

said flange-side pawls, when said leg-side pawls come up against said flange-side pawls, flex upward from the roots of said slits; and said leg-side pawls, when said legs are pivoted to said clamping attitude, engage with said flange-side pawls, and the surface of said member being attached to that is on the flange side comes up against said flange; and wherein slits having roots are formed on either side of each of said flange-side pawls.

2. The spacer clip according to claim 1, wherein said legs and said levers are provided at said shank end part in pairs, respectively, so as to be opposed in the radial direction of the shank.

3. The spacer clip according to claim 2, wherein recesses are formed in said flange-side pawls, protrusions are formed in said leg-side pawls, so as to be able to fit into said recesses, and when said leg-side pawls, engage with said flange-side pawls, said protrusions enter into said recesses.

4. The spacer clip according to claim 3, wherein projections are formed on said legs, on the surfaces thereof that come up against said member being attached to, for biting into said member being attached to.

5. The spacer clip according to claim 4, wherein said shank is formed hollow so as to accept a threaded stud, and a latching pawl is provided in that hollow portion for latching to the stud.

* * * * *